United States Patent
Stanley et al.

(10) Patent No.: US 11,612,176 B2
(45) Date of Patent: Mar. 28, 2023

(54) PLANT-BASED ELECTROLYTE COMPOSITIONS

(71) Applicant: THE STATE OF QUEENSLAND, Brisbane (AU)

(72) Inventors: Roger Anthony Stanley, Graceville (AU); Bandupala Wijesinghe, Nudgee (AU); Kodanda Ram Reddy Mereddy, Kenmore (AU)

(73) Assignee: THE STATE OF QUEENSLAND

( * ) Notice: Subject to any disclaimer, the term of this patent is extended or adjusted under 35 U.S.C. 154(b) by 66 days.

(21) Appl. No.: 16/275,079

(22) Filed: Feb. 13, 2019

(65) Prior Publication Data
US 2019/0174800 A1 Jun. 13, 2019

Related U.S. Application Data

(62) Division of application No. 13/697,069, filed as application No. PCT/AU2011/000536 on May 10, 2011, now abandoned.

(30) Foreign Application Priority Data

May 11, 2010 (AU) .............................. 2010902013

(51) Int. Cl.
  *A23L 2/74* (2006.01)
  *A23L 33/105* (2016.01)
  (Continued)

(52) U.S. Cl.
  CPC ................ *A23L 2/74* (2013.01); *A23L 2/085* (2013.01); *A23L 2/52* (2013.01); *A23L 33/105* (2016.08);
  (Continued)

(58) Field of Classification Search
  CPC ............ A23V 2250/21; A23V 2002/00; A23V 2250/032; A23V 2250/628;
  (Continued)

(56) References Cited

U.S. PATENT DOCUMENTS

| 3,657,424 A | 4/1972 | Attaway |
| 3,799,806 A | 3/1974 | Madsen |

(Continued)

FOREIGN PATENT DOCUMENTS

| CN | 1233422 A | 11/1999 |
| CN | 101194738 A | 6/2008 |

(Continued)

OTHER PUBLICATIONS

Additional Examination report issued by the Australian Patent Office, dated Feb. 17, 2014.

(Continued)

*Primary Examiner* — Hong T Yoo
(74) *Attorney, Agent, or Firm* — Marshall, Gerstein & Borun LLP

(57) ABSTRACT

This invention relates, inter alia, to various plant-based electrolyte compositions, methods of preparing them and methods of using them. One embodiment concerns a plant-based electrolyte composition comprising a plant-derived electrolyte content high in potassium relative to sodium, and a plant-derived carbohydrate content less than about 6% weight/volume. Another embodiment concerns a method for re-hydrating an individual or preventing dehydration or over-hydration of an individual or or preventing or treating potassium deficiency in an individual, by administering to the individual a plant-based electrolyte composition. The electrolyte compositions can be prepared from sugarcane juice, sugar beet juice, sweet sorghum juice, palm syrup, maple sap, vegetable juice or fruit juice.

18 Claims, 1 Drawing Sheet

(51) Int. Cl.
  *A23L 33/16* (2016.01)
  *A23L 2/08* (2006.01)
  *A23L 2/52* (2006.01)
  *C13B 20/16* (2011.01)
(52) U.S. Cl.
  CPC ............ *A23L 33/16* (2016.08); *C13B 20/165* (2013.01); *A23V 2002/00* (2013.01)
(58) Field of Classification Search
  CPC .......... A23V 2200/33; A23V 2250/156; A23V 2250/161; A23V 2250/16; A23V 2250/60; A23V 2200/30; A23V 2200/02; A23V 2200/3322; B01D 2311/04; B01D 2311/06; B01D 61/145; B01D 61/027; B01D 61/58; B01D 2311/2649; B01D 61/147; B01D 61/025; B01D 3/002; B01D 3/143; B01D 69/02; B01D 2317/025; B01D 61/022; B01D 11/0284; A23L 33/16; A23L 2/04; A23L 2/087; A23L 1/304; A23L 2/60; A23L 1/3002; A23L 2/385; A23L 2/39; A23L 2/74; A23L 33/105; A23L 1/22; A23L 2/085; A23L 2/52; A61K 9/0095; A61K 2800/522; A61K 31/05; Y10S 514/905
  See application file for complete search history.

(56) References Cited

U.S. PATENT DOCUMENTS

| | | | |
|---|---|---|---|
| 4,322,407 A | 3/1982 | Ko | |
| 5,403,604 A | 4/1995 | Black, Jr. et al. | |
| 5,407,696 A | 4/1995 | Hagiwara et al. | |
| 5,454,952 A | 10/1995 | Brewer | |
| 5,681,569 A | 10/1997 | Kuznicki et al. | |
| 6,096,136 A | 8/2000 | Saska | |
| 6,245,153 B1 | 6/2001 | Gonzales | |
| 6,406,547 B1 * | 6/2002 | Donovan ................ | C13B 10/00 127/43 |
| 6,406,548 B1 | 6/2002 | Donovan et al. | |
| 6,479,636 B1 | 11/2002 | Mirkov et al. | |
| 6,709,527 B1 | 3/2004 | Fechter et al. | |
| 6,730,337 B2 | 5/2004 | Hutt et al. | |
| 6,783,785 B1 | 8/2004 | Raghavan et al. | |
| 6,800,319 B1 | 10/2004 | Hulst et al. | |
| 7,001,612 B2 | 2/2006 | Armonti et al. | |
| 2002/0132034 A1 | 9/2002 | Hutt et al. | |
| 2003/0026884 A1 | 2/2003 | Mantius et al. | |
| 2003/0198694 A1 | 10/2003 | Chou | |
| 2004/0151815 A1 | 8/2004 | Jensen et al. | |
| 2004/0234658 A1 | 11/2004 | Bonnet et al. | |
| 2005/0095320 A1 | 5/2005 | Botteri et al. | |
| 2005/0100637 A1 | 5/2005 | Murray et al. | |
| 2006/0099318 A1 | 5/2006 | Iwasaki et al. | |
| 2007/0104851 A1 | 5/2007 | Iwasaki et al. | |
| 2008/0113066 A1 | 5/2008 | Highman et al. | |
| 2008/0124429 A1 | 5/2008 | Ghosh et al. | |
| 2008/0311265 A1 | 12/2008 | MacDonald et al. | |
| 2009/0159518 A1 | 6/2009 | Subramaniam et al. | |
| 2010/0004185 A1 | 1/2010 | Kannar et al. | |

FOREIGN PATENT DOCUMENTS

| | | |
|---|---|---|
| EP | 562100 A1 | 9/1993 |
| EP | 1178811 A1 | 2/2002 |
| JP | 10-108654 | 4/1998 |
| JP | 2002-161046 A | 6/2002 |
| JP | 2005-237290 A | 9/2005 |
| JP | 2005-237291 A | 9/2005 |
| JP | 2005-237292 A | 9/2005 |
| JP | 2005-287311 A | 10/2005 |
| JP | 2006-505261 A | 2/2006 |
| JP | 3907098 B2 | 4/2007 |
| JP | 2008-156173 A | 7/2008 |
| JP | 2009-044965 A | 3/2009 |
| JP | 2009-273442 A | 11/2009 |
| WO | WO-2001/014595 A2 | 3/2001 |
| WO | WO-2008/020457 A1 | 2/2008 |
| WO | WO-2008/039646 A2 | 4/2008 |

OTHER PUBLICATIONS

Balakrishnan et al., Significance of membrane type and feed stream in the ultrafiltration of sugarcane juice, *Separation Science and Technology*. 36:619-37 (2001).

Bhattacharya et al., Ultrafiltration of sugar cane juice for recovery of sugar: Analysis of flux and retention, *Separation and Purification Technology*. 21:247-59 (2001).

Buyckx, Hydration and health promotion: A brief introduction, *Journal of the American College of Nutrition*. 26:533S-534S (2007).

Chan et al., Role of ascorbic acid in CO2 evolution from heated acerola juice (*Malphigia Glabra* L.) *J. Agric. Food Chem*. 14:483-4 (1966).

Chou et al., SAT process as a replacement for sulfitation in mill white sugar production, *International Sugar Journal*. 108:247-53 (2006).

Chung et al., Direct production of refined sugar and value added products from sugar cane mills, Sugar Industry Technologists Sixty Third Annual Technical Conference, Vancouver, Canada (SIT Paper #865) 237-49 (2004).

Clein, Acerola juice, the richest known source of vitamin C: a clinical study in infants, *J. Pediatrics*. 48:140-5 (1956).

Colombo et al., Determination of flavonoids in cultivated sugarcane leaves, bagasse, juice and in transgenic sugarcane by liquid chromatography-UV detection, *J Chromatogr A*. 1103:118-24 (2006).

Daniells, Italy targets salt reduction to counter high intakes (2010).

Daniells, Salt's harmful effects may extend to artery hardening, Science & Nutrition Feb. 19, 2010.

Duarte-Almeida et al., Antioxidant activity of phenolics compounds from sugar cane (*Saccharum officinarum* L.) juice, *Plant Foods for Human Nutrition*. 61:187-92 (2006).

Extract from: Australian National Health and Medical Research Council, Nutrient Reference Values for Australia and New Zealand including Recommended Dietary Intakes, pp. 217-220 (2005).

Fechter et al., Direct production of white sugar and whitestrap molasses by applying membrane and ion-exchange technology in a cane sugar mill, *Proceedings of the International Society of Sugar Cane Technologists*. 24:100-7 (2001).

First Examination report issued by the Australian Patent Office, dated Aug. 28, 2013.

Ghosh et al., Pilot plant demonstration of sugar cane juice ultrafiltration in an Indian sugar factory, *Journal of Food Engineering*. 58:143-50 (2003).

Ghosh et al., Ultrafiltration of sugarcane juice with spiral wound modules: On-Site pilot trials, *Journal of Membrane Science*. 174:205-16 (2000).

Group, Encyclopedia of Mind Enhancing Foods, Drugs and Nutritional Substances, 2nd Edition, McFarland & Company, Inc. Publishers, 2015.

Haight et al., Red and white grape juice concentrate component ranges, *Journal of Food Composition and Analysis*. 8:71-7 (1995).

Hand et al., Public Health takes aim at sugar and sale, Harvard School of Public Health News Fall 2009 (http://www.hsph.harvard.edu/news/magazine/sugar-and-salt/).

Hinkova et al., Membrane Filtration in the Sugar Industry, *Chem. Papers*. 54:375-82 (2000).

Hinkova et al., Potentials of separation membranes in the sugar industry, *Separation and Purification Technology*. 26:101-110 (2002).

Hinkova et al., Sugar beet as a raw material for bioethanol production, *Czech J. Food Sci*. 19:224-34 (2001).

Hooge, Impact of potassium chloride on saltiness, bitterness, and other sensory characteristics in model soup systems, Thesis, Master of Science, Kansas State University (2008).

https://www.merriam-webster.com/dictionary/extract, retrieved online Nov. 5, 2018 (2018).

(56) References Cited

OTHER PUBLICATIONS

Jensen, Direct white sugar manufacture in the cane sugar industry via membrane filtration and continuous ion-exchange demineralisation, *Sugar Industry*. 132:446-52 (2007).
Jensen, Raw sugar quality from a refiner's perspective, *Proceedings of the Australian Society of Sugar Cane Technologists*. 31:512-20 (2009).
Kearney, The amalgamated beet/cane raw juice chromatographic separator; 1995-1996 beet pilot test, Proceedings of the Workshop on Separation Processes in the Sugar Industry, New Orleans, Apr. 1996, 69-86.
Khaw et al., The association between blood pressure, age, and dietary sodium and potassium: a population study, *Circulation*. 77:53-61 (1988).
Koge, Inhibitory effects of sugar cane extracts on liver injuries in mice, *Journal of the Japanese Society for Food Science and Technology*. 48:231-7 (2001).
Kosutic et al., Removal of antibiotics form a model wastewater by RO/NF membranes, *Separation and Purification Technology*, 53:244-9 (2007).
Kotchen et al., Dietary electrolytes and blood pressure: a statement for healthcare professionals from the American Heart Association Nutrition Committee, *Circulation*. 98:613-7 (1998).
Kwok, Production of super VLC raw sugar in Hawaii. Experience with the new NAP ultrafiltration/softening process, *International Sugar Journal*. 98:490-6 (1996).
Laopaiboon et al., Ethanol production from sweet sorghum juice using very high gravity technology: effects of carbon and nitrogen supplementations, *Bioresour. Technol*. 100:4176-82 (2009).
Lipnizki et al., Applications of membrane processes in the beet and cane sugar production, *Zuckerind*. 131:29-38 (2006).
Martoyo et al., Pilot test on ultrafiltration of cane raw juice at the Indonesian plantation white Kedawoeng sugar factory, *Zuckerindustrie*. 125:787-92 (2000).
Maughan et al., Sports Drinks, CRC Press LLC, United States of America, Chapters 4 and 8 (in part) and chapters 1 and 7 (in full) (2001).
Miller et al., Acerola Nutritive Value and Home Use, Hawaii Agricultural Experiment Station, University of Hawaii Circular 59 Jun. 1961.
Mindler, Demineralization of sugar cane juice: a pilot plant study, *Ind. Eng. Chem*. 40:1211-15 (1948).
Monclin, The ABC process for direct production of refined sugar from cane mixed juice, Proceedings of the Workshop on Separation Processes in the Sugar Industry, New Orleans, Apr. 1996, 16-28.
Nainggolan, Ripe for change: US ponders population wide salt reduction policies, http://www.medscape.com/viewarticle/718988 (Jan. 29, 2010).
Nakasone et al., Antioxidative compounds isolated from Kokuto, non-centrifuged cane sugar, *Bioscience, Biotechnology and Biochemistry*. 60:1714-16 (1996).
Nene et al., Membrane distillation for the concentration of raw cane-sugar syrup and membrane clarified sugar can juice, *Desalination*. 147:157-60 (2002).
Nicolaidis, Thirst and its control, Physiology of Thirst, Book chapter in Hydration Throughout Life, Ed. Arnaud, M.J. John Libbey Eurotext, Paris (1998).
Nwuha, Novel studies on membrane extraction of bioactive components of green tea in organic solvents: part I, *Journal of Food Engineering*. 44:233-8 (2000).
Office Action for CN 201180023722.3 dated Aug. 2, 2013.
Optimal Health Fall 2009—Winter 2010 Catalogue.

Payet et al., Comparison of the concentrations of phenolic constituents in cane sugar manufacturing products with their antioxidant activities, *J. Agric. Food Chem*. 54:7270-6 (2006).
"Plant—Wikipedia, the free encyclopedia," Nov. 30, 2009, retrieved form Waybackmachine Internet Archive, Jun. 10, 2015.
Porcu et al., Variation in the carotenoid composition of acerola and its processed products, *Journal of the Science of Food and Agriculture*. 86:1916-20 (2006).
Rektora et al., Application of membrane filtration methods for must processing and preservation, *Desalination*. 162:271-77 (2004).
Righetto et al., Chemical composition and antioxidant activity of juice from mature and immature acerola (*Malpighia emarginata* DC), *Food Science and Technology International*. 11:315-21 (2005).
Righetto et al., Effect of encapsulating materials on water sorption, glass transition and stability of juice from immature acerola, *International Journal of Food Properties*. 8:337-46 (2005).
Saleh et al., Separation and concentration of health compounds by membrane filtration, Handbook of Environmental Chemistry, vol. 5: Water Pollution, 2:1-14 (2006).
Second Examination report issued by the Australian Patent Office, dated Nov. 6, 2013.
Second Office Action in respect of Chinese family member (CN201180023722.3), dated Mar. 31, 2014.
Silva de Freitas et al., Storage stability of acerola tropical fruit juice obtained by hot fill method, *International Journal of Food Science & Technology*. 41:1216-1 (2006).
Singleton et al., Analysis of total phenols and other oxidation substrates and antioxidants by means of Folin-Ciocalteu reagent, *Methods in Enzymology*. 299:152-78 (1999).
"Sports Drink" redefined. An isotonic sports drink derived from pure coconut water. wwww.vedalyte.com, as at Dec. 28, 2007.
Steindl et al., Applications and benefits of membrane filtration for the Australian sugar industry, *Proceedings of the Australian Society of Sugar Cane Technologists*. 21:406-11 (1999).
Stuff and Nonsense. Retrieved from the internet <URLhttp://jdc325.wordpress.com/2007/09/24/apple-cider-vinegar/> published on Sep. 24, 2007.
Supplementary European Search Report and Opinion, dated Dec. 9, 2013.
Takara et al., New antioxidative phenolic glycosides isolated from Kokuto non-centrifuged cane sugar, *Biosci. Biotechnol. Biochem*. 66:29-35 (2002).
Tebble et al., The use of membrane filtration to reduce lime usage in purification, *Zuckerind*. 127:600-3 (2002).
Tragardh et al., Membrane technology in the sugar industry, *Desalination*. 69:9-17 (1988).
Tucker et al., Potassium, magnesium, and fruit and vegetable intakes are associated with greater bone mineral density in elderly men and women, *Am. J. Clin. Nutr*. 69:727-36 (1999).
Van der Horst et al., Use of nanofiltration for concentration and demineralization in the dairy industry: Model for mass transport, *Journal of Membrane Science*. 104:205-18 (1995).
"Vegetable—Wikipedia, the free encyclopedia", Dec. 1, 2009, retrieved from Waybackmachine Internet Archive, Jun. 10, 2015.
Walford, Composition of cane juice, *Proceedings of the South African Sugar Technologists' Association*. 70:265-6 (1996).
Wijesinghe et al., Membrane fractionation technologies for high quality mill sugar and value-added by-products—An integrated sugar production process concept model, *Proceedings of the Australian Society of Sugar Cane Technologists*. 31:593 (2009).
Yong et al., The chemical composition and biological properties of coconut (*Cocos nucifera* L.) water, *Molecules*. 14:5144-64 (2009).

\* cited by examiner

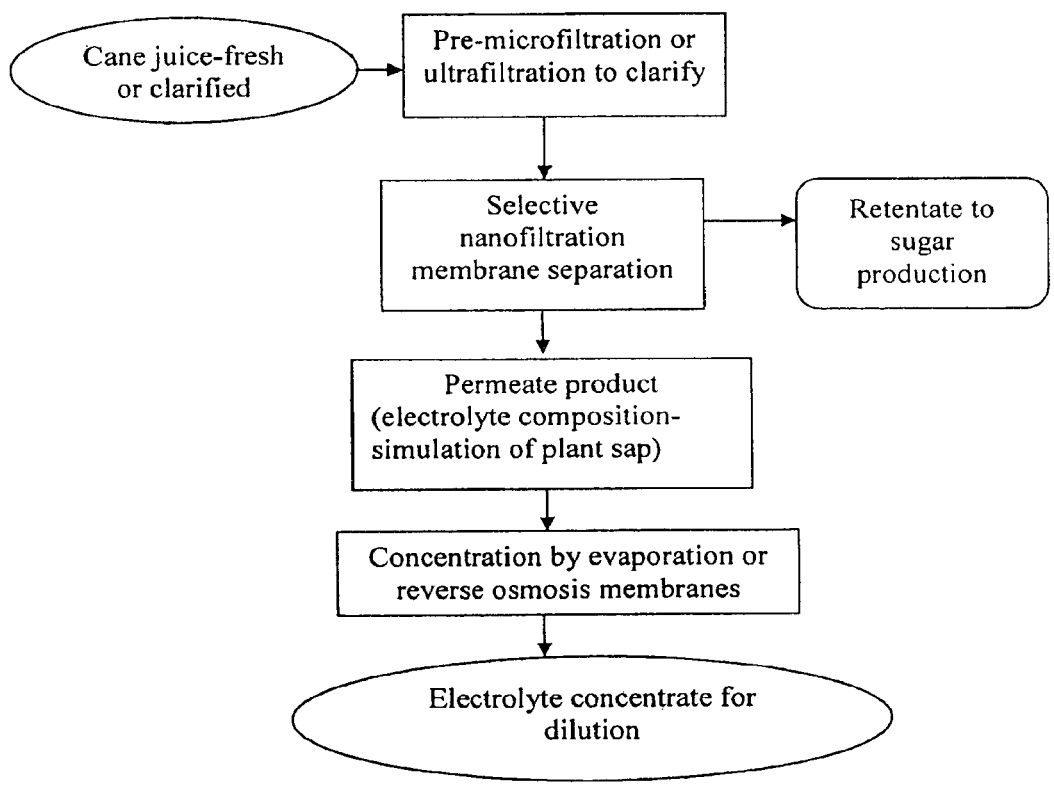

PLANT-BASED ELECTROLYTE COMPOSITIONS

TECHNICAL FIELD

This invention relates, inter alia, to plant-based electrolyte compositions and to methods of preparing them. In one embodiment the invention concerns natural electrolyte compositions prepared from sugarcane that have an electrolyte content high in potassium relative to sodium and a low carbohydrate content in comparison with most commercially available plant juice drink products.

BACKGROUND ART

Drink products are consumed to replace fluids and minerals (salts/electrolytes) lost in sweating and excretion. Plain or natural water has a low mineral content and therefore does not adequately replace such minerals. It is also limited in its thirst quenching ability and therefore can provide lower effectiveness in satiating water intake compared to other drink products.

Electrolyte drink products are consumed to replace salts (minerals/electrolytes) lost due to sweating or gastrointestinal diarrhoea. The salts are essential for muscle and nerve functioning. Commercially available electrolyte drink products are conventionally formulated using mainly sodium salts with glucose and other ingredients mimicking the content of sweat and plasma as well as providing nutrients thought to be of assistance in recovery from exercise. These 'chemical mixtures' are mainly sodium salt based but for most of the population sodium salt intake already greatly exceeds dietary recommendations. Excessive sodium intake due to its use in cooking and processed foods is a noted and widespread cause of raised blood pressure and dietary recommendations are to reduce levels.

Commercially available energy drink products are formulated to provide a boost of carbohydrate energy to the working muscles which may be aided by the addition of caffeine or other stimulants. Consumption of the higher levels of sugars while re-hydrating can result in net energy intake above that lost in exercise.

Commercially available juice drink products are sold as a natural fluid replacement. Most juices are naturally low in sodium and high in potassium salts but normally contain 6-12% weight/volume carbohydrates and are hyper-osmotic compared to human blood plasma. The use of juices in re-hydrating can result in high energy intake and a contribution to weight gain due to their natural sugar content. Fruit juices also have an acidic nature with a low pH due to organic acids that is counter balanced in taste by the sugar. Acid fruit juices can exacerbate gastrointestinal conditions causing stomach upset or irritation to the mouth and throat. The acidic nature can also contribute to erosion of the tooth enamel.

DISCLOSURE OF INVENTION

An object of the present invention is to provide plant-based (naturally-based) electrolyte compositions for consumption that have a low, or substantially no, carbohydrate/sugar content and an electrolyte content rich in potassium relative to sodium, as well as methods for preparing them. Another object of the present invention is to provide the public with a useful or commercial choice.

According to a first aspect of the present invention there is provided a plant-based electrolyte composition comprising:
a plant-derived electrolyte content high in potassium relative to sodium; and
a plant-derived carbohydrate content less than about 6% weight/volume.

Preferably the carbohydrate content of the electrolyte composition is less than about 6% weight/volume (w/v), 5% w/v, 4% w/v or 3% w/v and even more preferably about 0-2% w/v (although other percentages are envisaged), such that the content is significantly less than that of commercially available juice drink products. However, the carbohydrate content will depend on the type of plant or plants from which the plant-based electrolyte composition is prepared and its method of preparation.

Preferably the electrolyte composition comprises about 0.050% to 0.200% w/v potassium, more preferably about 0.060% to 0.130% w/v potassium, and even more preferably about 0.064% to 0.109% w/v potassium (although other percentage ranges are envisaged), such that the electrolyte is of sufficient quantity for the intended use and is of higher content that some commercially available electrolyte drink products. However, the potassium content will depend on the type of plant or plants from which the plant-based electrolyte composition is prepared and its method of preparation.

Preferably the electrolyte composition comprises low level sodium of about 0.000% to 0.050% w/v sodium, more preferably about 0.001% to 0.030% w/v sodium, and even more preferably about 0.007% to 0.030% w/v sodium (although other percentage ranges are envisaged), so as to minimise or avoid the problems caused by commercially available high sodium products. However, the sodium content will depend on the type of plant or plants from which the plant-based electrolyte composition is prepared and its method of preparation.

The electrolyte composition can comprise low molecular weight phenolic antioxidants of about 0.000% to 0.200% w/v, more preferably about 0.002% to 0.133% w/v, and even more preferably about 0.006% to 0.062% w/v (although other percentage ranges are envisaged). This may be useful for some forms of drink products. However, the phenolic antioxidants content will depend on the type of plant or plants from which the plant-based electrolyte composition is prepared and its method of preparation.

The electrolyte composition can comprise a low organic acid content so as to avoid an acidic taste that otherwise may need to be masked by sugar or other specific additive. The electrolyte composition preferably comprises a low organic acid content of about 0.01% to 1.60% w/v, more preferably about 0.05% to 0.50% w/v, and even more preferably about 0.11% to 0.21% w/v (although other percentage ranges are envisaged). However, the organic acid content will depend on the type of plant or plants from which the plant-based electrolyte composition is prepared and its method of preparation.

A typical sugarcane-based electrolyte composition can comprise, for example, about $K^+$–0.064 to 0.109% w/v, $Na^+$–0.002 to 0.030% w/v, $Mg^{2+}$–0.002 to 0.010% w/v and 0.5 to 2.0% w/v carbohydrates (mainly monosaccharides glucose and fructose).

A typical apple juice-based electrolyte composition can comprise, for example, about $K^+$–0.05 to 0.100% w/v, $Na^+$–0.002 to 0.020% w/v, $Mg^{2+}$–0.002 to 0.010% w/v and 0.5 to 5.0% w/v carbohydrates (mainly monosaccharides glucose and fructose).

The plant-based electrolyte composition can be prepared from a substantially liquid extract of any suitable type of plant or plants. The term "substantially liquid extract of a plant" is to be understood herein as referring to a liquid, a substantially liquid, a substantially liquefied and/or a liquefied extract of a plant that may either contain or not contain suspended particulate matter. The term is meant to encompass, but not be limited to, plant-derived waters, saps, juices, syrups and other types of viscous and non-viscous liquids and liquefied plant parts.

The substantially liquid extract can be, for example, sugarcane juice, sugar beet juice, sweet sorghum juice, palm syrup, maple sap, vegetable juices such as carrot juice, and fruit juices such as apple and orange juice. Preferably the plant is of the type normally used in the manufacture of sugar, eg. sugarcane and sugar beet, and more preferably sugarcane.

The electrolyte composition can be processed to any suitable final form. It can be in a liquid (free-flowing or viscous), gelatinous or solid form. The composition can be formulated, for example, as a drink product/beverage, concentrate, additive for other drink products, gel, powder, effervescent powder, granule, capsule or tablet.

In the case of dried or concentrated products made from the electrolyte the percentage composition will vary proportionally to the water removed.

In preferred embodiments, the composition is formulated as a re-hydrating drink product or osmotic or hypo-osmotic electrolyte replacement drink product (for athletes, for example) or a dietary source of potassium.

It is possible that the drink product could be in the form of an alcoholic beverage, mineral water, soda water, carbonated water, tonic water or syrup, for example. The electrolyte composition could be mixed with alcohol or different types of waters, including distilled and de-ionised water.

Depending on the form of the composition, the composition can further comprise at least one or more of the following types of ingredients: an active (including biologically active) agent, nutrient, dietary supplement, stimulant, sweetening agent, flavouring agent, colouring agent, binding agent, emulsifier, buffering agent, disintegrating agent, absorption enhancer, lubricant, glidant, flow regulating agent, viscosity modifying agent, diluent and preservative.

For example, the composition can comprise at least one or more of the following types of ingredients: an amino acid, vitamin, mineral, additional electrolyte, protein (eg. calcium caseinate, whey protein, whey protein isolate, soy protein, casein hydrolyzate, meat protein, yeast concentrate), caffeine or other stimulant and dietary fibre.

According to a second aspect of the present invention there is provided a plant-based electrolyte composition according to the first aspect in the form of a concentrate.

The electrolyte composition can be concentrated about 5 to 40 times (preferably about 20 times), for example, depending on the sugar content to make a liquid concentrate suitable for storage and shipment. The concentrate can preferably be readily reconstituted into ready-to-consume drink products to be osmotic or hypo-osmotic or hyper-osmotic as desired by the application.

According to a third aspect of the present invention there is provided a drink product prepared from a plant-based electrolyte composition according to the first aspect or a concentrate according to the second aspect.

The drink product can be, for instance, for re-hydrating an individual, for preventing dehydration or over-hydration of an individual. The drink product can be an electrolyte replacement drink product or a dietary source of potassium.

Gatorade™ is an example of a commercially available drink product that athletes drink to restore electrolytes in the body after participating in sports and to avoid dehydration (although that drink product is unlike the present invention in that it is comparatively rich in sodium and not naturally based).

According to a fourth aspect of the present invention there is provided a method for re-hydrating an individual or preventing dehydration or over-hydration of an individual or for preventing or treating potassium deficiency in an individual, said method comprising administering to the individual a composition according to the first aspect, a concentrate according to the second aspect or a drink product according to the third aspect of the invention.

According to a fifth aspect of the present invention there is provided the use of a composition according to the first aspect, a concentrate according to the second aspect or a drink product according to the third aspect of the invention in the preparation of a medicament for re-hydrating an individual, for preventing dehydration or over-hydration of an individual, or for preventing or treating potassium deficiency in an individual.

According to a sixth aspect of the present invention there is provided a method of preparing a plant-based electrolyte composition, wherein the method comprises the step of processing a substantially liquid extract of a plant to produce a plant-based electrolyte composition according to the first aspect of the invention.

According to a seventh aspect of the present invention there is provided a method of preparing a plant-based electrolyte composition in the form of a concentrate, wherein the method comprises the step of processing a plant-based electrolyte composition prepared according to the sixth aspect of the present invention to produce the concentrate according to the second aspect of the invention.

According to an eighth aspect of the present invention there is provided a method of preparing a drink product from a plant-based electrolyte composition or a concentrate thereof, wherein the method comprises the step of mixing the plant-based electrolyte composition prepared according to the sixth aspect or the concentrate prepared according to the seventh aspect of the invention with at least one other ingredient to produce the drink product.

Any suitable type or types of processing steps can be used. For example, liming, clarification, filtration and evaporation steps can be used. Further steps such as initial plant-crushing, affination, decolourisation, crystallisation and recovery can be used, if required.

Preferably membrane separation technology is used to filter out and reduce the carbohydrate content yet retain most of the minerals/salts/electrolytes, through selection of membranes with different pore sizes. Preferably the membrane process is operated to reduce the initial carbohydrate content to about 0-6% w/v but optimally 0-2% w/v, yet yielding greater than about 60% w/v concentration and more preferably greater than about 80% w/v potassium concentration in the electrolyte composition.

Microfiltration or ultrafiltration can be used, for example, to clarify the substantially liquid extract.

Nanofiltration (polymeric, ceramic and metallic membranes) can be used, for example, to separate at least some of the carbohydrate content from the electrolyte content.

Nanofiltration (polymeric, ceramic and metallic membranes) can be used, for example, to separate at least some of the organic acid content from the electrolyte content.

Evaporation and/or filtration step (eg. reverse osmosis) can be used, for example, to prepare the concentrate.

If using sugarcane juice, the juice can be briefly heat treated at 80° C. to control microbial and enzymatic activity followed by coarse filtration, prior to lowering the carbohydrate content. Alternatively, lime clarified juice can be used.

According to a ninth aspect of the present invention there is provided a method of preparing a sugarcane-based electrolyte composition, wherein steps of the method comprise:
1. using a step of microfiltration or ultrafiltration to clarify fresh or clarified sugarcane juice; and
2. using a step of nanofiltration to reduce the clarified juice's carbohydrate content to produce a sugarcane-based electrolyte composition comprising an electrolyte content high in potassium relative to sodium and a carbohydrate content less than about 6% weight/volume; and optionally
3. using a step of evaporation or reverse osmosis filtration to prepare a concentrate of the electrolyte composition of step 2.

According to a tenth (more general) aspect of the present invention there is provided a plant-based electrolyte composition, wherein steps of the method comprise:
1. using a step of microfiltration or ultrafiltration to clarify a substantially liquid extract of a plant; and
2. using a step of nanofiltration to reduce the clarified substantially liquid extract's carbohydrate content to produce a plant-based electrolyte composition comprising an electrolyte content high in potassium relative to sodium and a carbohydrate content less than about 6% weight/volume; and optionally
3. using a step of evaporation or reverse osmosis filtration to prepare a concentrate of the electrolyte composition of step 2.

According to an eleventh aspect of the present invention there is provided a method for making a drink product from a substantially liquid extract of a plant using membrane filtration technology, wherein the drink product simulates plant sap, said method comprising the steps of:
1. clarifying the substantially liquid extract of the plant;
2. using membranes selected to have pore sizes suitable to remove some of, but preferably all or most of, the sugar and some of the organic acids of the substantially liquid extract but leaving most of the monovalent ions including potassium in the substantially liquid extract; and
3. optionally, concentrating the substantially liquid extract by reverse osmosis membranes and/or evaporation to make a substantially liquid extract concentrate.

According to an twelfth aspect of the present invention there is provided a plant juice-derived drink product that simulates plant sap in its mineral, sugar and antioxidant content.

According to a thirteenth aspect of the present invention there is provided a plant-based electrolyte composition prepared from a substantially liquid extract of a plant by membrane separation technology, said plant-based electrolyte composition comprising:
1. a plant-derived electrolyte content high in potassium relative to sodium; and
2. a plant-derived carbohydrate content less than about 6% weight/volume, and preferably 0-2% weight/volume plant-derived carbohydrate, wherein the plant-based electrolyte composition comprises greater than about 80% weight/volume potassium of an original potassium concentration of the substantially liquid extract of the plant, but more preferably greater than about 95% weight/volume of the original potassium concentration of the substantially liquid extract of the plant.

The inventors have found that during the concentration of sugar from juice by membrane technology, a product stream can be generated that is similar to plant sap, being the liquid form that plants store and transport liquid and nutrients through the plant from roots to leaves. The inventors have found that the production process can be controlled to recover most of the mineral/electrolyte/salt and importantly most of the potassium content but with only a low percentage of the sugar from the juice.

The inventors have also found that the electrolyte composition or concentrated form thereof can be a good base for a re-hydration or electrolyte replacement drink. It can have low acidity with a clean and slightly salty taste, without sweetness. When consumed it can have a good thirst quenching sensation being able to better the control the sensation of dryness in the mouth and throat associated with a need for liquids. This in combination with the high potassium to sodium mineral salts ratio and isotonic or lower concentration makes it effective in re-hydration and preventing over-hydration. Over-hydration occurs when the normal balance of electrolytes is pushed outside limits by over-consumption of water. Over-hydration can occur, for example, when athletes rapidly drink excessive amounts of water or substantially hypo-osmotic electrolyte sports drinks to avoid dehydration. The result is too much water and not enough salts and people may become confused or have seizures.

The electrolyte composition can be made by using membranes to achieve a physical separation of carbohydrates (sugars) to leave small ion electrolytes such as potassium, and other minor cell constituents similar to the content of plant sap. The amount of natural sugar including glucose and fructose going into the electrolyte composition can be varied between about 0 and 6% w/v (preferably 2% w/v) through selection of membranes with different pore sizes. The resulting electrolyte composition can be concentrated about 5-40 times depending on the sugar content to make a clear liquid concentrate suitable for storage and shipment. The concentrate can be reconstituted into ready-to-drink products.

The drink product can be a natural isotonic re-hydration drink product low in carbohydrate and high in potassium. It is an alternative to water (which has no electrolytes), juice (which is high in sugar) and formulated electrolyte drinks (produced by the mixing of chemicals). To the inventors' knowledge there is no publicly available prior information for making a plant sap like product from juices by removal of sugar and acids using membranes or to using such a product as a drink or high potassium electrolyte replacement product.

The mechanisms controlling thirst have been extensively researched as well as some of the thirst quenching properties of water and other drinks. While the thirst quenching effect is currently a subjective and unexpected observation the effect can be scientifically measured. However there appears to be no reference in literature that looks at the thirst quenching properties of sugar and acid depleted juices or plant saps. There appears to be no prior literature showing the superior thirst quenching properties of such a product although low sugar, low acid products are known to generate this effect but not fruit juices. No discussion of the potential mechanism of thirst quenching in relation to high potassium electrolyte content have been found. Likewise no studies in prevention of over-hydration using natural electrolyte products have been found although the mechanism is well understood. Treatment consists of supplying salts and/or diuretics to bring the plasma electrolytes into the required range for normal cell functioning. The natural electrolyte composition could prevent the problem from occurring.

The impact of high sodium and the need to reduce the level for health particularly blood pressure reduction is extensively published. No commercial drink products other than juice and fresh foods have been found that are made to promote low sodium, high potassium intake.

It is to be appreciated that the first to twelfth aspects of the invention can have one or more features as described anywhere in the section entitled "Disclosure of the Invention" (provided that the features are not incompatible with one another) or as described in the "Preferred Embodiments of the Invention" section.

In order that the invention may be more readily understood and put into practice, preferred embodiments thereof will now be described with reference to the FIGURE, by way of example only.

FIG. 1 is a schematic showing preparation of a sugarcane-based electrolyte composition and its concentrate using sugarcane juice as starting material.

PREFERRED EMBODIMENTS OF THE INVENTION

Although the preparation of electrolyte compositions and their concentrates from sugarcane juice and apple juice will be exemplified below, other plant sources used for the manufacture of sugar can be used, such as sugar beet, sweet sorghum, palm syrup, maple sap, vegetable juices such as carrot juice and fruit juices such as orange (but excluding coconut water or coconut juice).

However, as explained above, the actual electrolyte, sugar/carbohydrate, flavonoid/phenolic antioxidant and organic acid content of each electrolyte composition will ultimately depend on the type of plant or plants from which the plant-based electrolyte composition is prepared as well as its method of preparation.

Example 1—Preparation of a Sugarcane-Based Electrolyte Composition and its Concentrate This example describes the preparation of a sugarcane-based electrolyte composition and its concentrate using sugarcane juice as starting material. A schematic of the process is shown in FIG. 1.

Table 1 below shows the typical composition of sugarcane juice based on solids (Walford S (1996) Composition of cane juice. *Proceedings of the South African Sugar Technologists' Association* 70, 265-266.)

TABLE 1

| Fraction | Component | Content (% w/w) |
| --- | --- | --- |
| Sugars | Sucrose | 81-87 |
|  | Reducing sugars | 3-6 |
|  | Oligosaccharides | 0.06-0.6 |
|  | Polysaccharides (including gums and dextrans) | 0.2-0.8 |
| Salts | Inorganic salts: | 1.5-3.7 |
|  | Potassium ($K_2O$) | 0.77-1.31 |
|  | Sodium ($Na_2O$) | 0.01-0.04 |
|  | Magnesium (MgO) | 0.10-0.39 |

TABLE 1-continued

| Fraction | Component | Content (% w/w) |
| --- | --- | --- |
| Organic non-sugars | Organic acids | 0.7-1.3 |
|  | Amino acids | 0.5-2.5 |
|  | Dextrans | 0.1-0.6 |
|  | Starch | 0.11-0.5 |
|  | Gums | 0.02-0.05 |
|  | Waxes, fats, phospholipids | 0.05-0.15 |
|  | Colourants | 0.1 |
| Insolubles | Sand, bagasse, etc. | 0.15-1.0 |

Pre-filtered sugarcane juice from a mill (essentially as described in table 1) was microfiltered using a 0.1 μm pore size membrane to remove any fine particulate material.

200 L of microfiltered juice was then sent through a nanofiltration (NF) membrane of specific pore size to produce an electrolyte composition fraction comprising a high electrolyte content relative to a carbohydrate content, wherein the electrolyte content is high in potassium relative to sodium. Most of the carbohydrate/sugar content and large molecules were separated as a retentate fraction from the permeate fraction (ie. permeate fraction=electrolyte composition).

Approximately 30% (61.9 L) of the 200 L microfiltered juice feed was separated and collected as single strength electrolyte, ie. the electrolyte composition, but could be optimised to collect more in the permeate fraction. If desired, the retentate can be returned to the refinery to purify the sugar.

The electrolyte composition (single strength electrolyte) was concentrated to 3.2 L with almost 20 times concentration using a reverse osmosis (RO) membrane.

A typical non-concentrated electrolyte composition is: $K^+$–0.064 to 0.109% w/v, $Na^+$–0.002 to 0.030% w/v, $Mg^{2+}$–0.002 to 0.010% w/v and 0.5 to 2.0% w/v carbohydrate/sugars (mainly monosaccharides). This composition also contains some low molecular weight phenolic antioxidants and can be concentrated to yield a stable clear syrup of yellowish colour. The composition is largely devoid of organic acids.

A nutritional panel of the concentrate and the equivalent diluted product is given in table 2 below:

TABLE 2

| Nutrition information | | |
| --- | --- | --- |
|  | Quantity per 100 mL electrolyte composition concentrate | Quantity per 100 mL electrolyte composition |
| Energy | 516 kJ | 26.85 kJ |
|  | (123 Cal) | (6.40 Cal) |
| Protein | Less than 1 g | Less than 0.05 g |
| Fat - total | Less than 1 g | Less than 0.05 g |
| Carbohydrate, total | 29.8 g | 1.55 g |
| sugars | 29.8 g | 1.55 g |
| Potassium | 1613 mg | 83.94 mg |
|  | 41.3 (mmol) | 2.15 (mmol) |
| Sodium | 172 mg | 8.95 mg |
|  | 7.5 (mmol) | 0.39 (mmol) |
| Magnesium | 64 mg | 3.33 mg |
|  | 2.7 (mmol) | 0.14 (mmol) |

Two possible re-hydration drink products, prepared by mixing the non-concentrated electrolyte composition with different ingredients, are described in tables 3 and 4 below.

TABLE 3

First re-hydration drink product

| Ingredient | Amount |
|---|---|
| Non-concentrated electrolyte composition (containing 2% w/v sugar) | 999 mL |
| Vitamin C (preservative and vitamin) | 200 mg |
| Orange oil (flavouring agent) | 200 mg |
| Natural colour (E163) | 200 mg |

TABLE 4

Second re-hydration-drink product

| Ingredient | Amount |
|---|---|
| Non-concentrated electrolyte composition (containing 2% w/v sugar) | 900 mL |
| Vitamin C (preservative and vitamin) | 200 mg |
| Natural fruit juice (flavouring and colouring agent) | 100 mL |

Example 2—Preparation of a Sugarcane-Based Electrolyte Concentrate

This example describes the preparation of a sugarcane-based electrolyte concentrate using clarified sugarcane juice as starting material.

Sugarcane electrolyte concentrate was produced from clarified sugarcane juice filtered through 100 micron stainless steel strainer from a sugar mill. The clarified juice of about 10.9% w/w total sugars was used in a two-step membrane process to produce sugarcane electrolyte concentrate (sugarcane plant sap concentrate).

A first step of the filtration was conducted using a nanofiltration (NF) membrane at an operating pressure of 35 bar and 40° C. temperature. About 375 kg of the juice was taken into a jacketed stainless steel tank and heated up to 40° C. The juice from the tank was pumped into a high pressure membrane filtration unit feed tank which is of about 20 kg capacity. The feed was frequently topped-up with fresh juice as the filtration continued while a portion of the retentate (concentrated feed) fraction was withdrawn from the feed tank at regular intervals as it reached the Brix value of about 25.

The NF permeate fraction which was very low in sugar (<1.5% w/w) and mineral (monovalent salts) content almost equal to that of feed was continuously separated. At the end of the trial about 55% of the total feed was separated as low sugar permeate fraction and up to 45% sugar rich fraction as NF retentate.

The NF permeate fraction low in sugar and mineral content similar to that of clarified juice is considered as a single strength natural electrolyte. The single strength electrolyte (SSE) was heated to around 40° C. in a jacketed stainless steel tank and pumped into a membrane unit fitted with a reverse osmosis (RO) membrane at stage 2 filtration. The SSE was concentrated up to twenty-fold at operating pressure of 35 bar and 40° C. temperature. Permeate obtained from stage 2 was only water with zero Brix value. The feed tank was continuously topped-up with fresh SSE as the filtration continued. The process was carried out until the concentration of electrolyte raised to about twenty times of that of the SSE.

Table 5 below shows a typical composition of the sugarcane electrolyte concentrate.

TABLE 5

| | Fraction weight kg | Total Sugars % w/w | Potassium mg/100 g | Sodium mg/100 g | Magnesium mg/100 g | Total Phenolics as mg GAE/100 mL | Titratable Acidity as mg AAE/100 mL |
|---|---|---|---|---|---|---|---|
| Clarified sugarcane juice | 372.4 | 10.9 | 74.6 | <5 | 12 | 60.8 | 88 |
| NF retentate | 164.8 | 23.1 | 98.1 | <5 | 24 | 155.5 | 351 |
| NF permeate (SSE) | 207.6 | 0.6 | 60.6 | <5 | <5 | 5.0 | 38 |
| Sugarcane electrolyte concentrate | 10.9 | 11.7 | 800.0 | 22 | 58.9 | 153.4 | 234 |

GAE = Gallic Acid Equivalents;
AAE = Aconitic Acid Equivalents

Example 3—Preparation of an Apple Juice-Based Electrolyte Concentrate

This example describes the preparation of an apple juice-based electrolyte concentrate using apple juice concentrate as starting material.

A commercial apple juice concentrate of about 70 Brix was diluted with seven times RO water to obtain a single strength apple juice. This single strength juice with about 7.9% total sugars by weight was used as feed for apple electrolyte production.

A two-step membrane filtration process similar to the one described in Example 2 was used to produce apple electrolyte concentrate.

In step 1 apple juice feed was heated to 40° C. and filtered using a nanofiltration membrane. The NF permeate, unlike sugarcane juice permeate, was found to have around 4% total sugars. This is because the sugars present in the apple juice are mainly monosaccharides such as fructose and glucose (instead of sucrose as in sugarcane juice) and easily permeate through the NF membrane. In this case permeate and retentate were split in the ratio of 70:30.

The NF permeate with relatively higher sugar concentration compared to sugarcane juice permeate and mineral concentration equal to that of apple juice feed was fed into step 2 membrane filtration. A reverse osmosis membrane was used in step 2 to concentrate single strength electrolyte obtained from step 1. In this case concentration of the electrolyte was increased only by about 3.5 fold as the feed sugar concentration was already around 4.

Table 6 below shows a typical composition of the apple juice electrolyte concentrate.

TABLE 6

|  | Fraction weight kg | Total Sugars % w/w | Potassium mg/100 g | Sodium mg/100 g | Magnesium mg/100 g | Total Phenolics as mg GAE/100 mL | Titratable Acidity as mg MAE/100 mL |
|---|---|---|---|---|---|---|---|
| Apple juice feed | 403.0 | 7.9 | 84.5 | <5 | <5 | 11.9 | 148 |
| NF retentate | 106.2 | 16.9 | 116.0 | <5 | 7 | 46.1 | 293 |
| NF permeate (SSE apple) | 296.8 | 4.1 | 73.5 | <5 | <5 | 5.4 | 153 |
| Apple electrolyte concentrate | 83.9 | 14.5 | 287.0 | <5 | <5 | 32.8 | 759 |

GAE = Gallic Acid Equivalents
MAE = Malic Acid Equivalents

Clarified sugarcane juice of Example 2 shows that the NF permeate (SSE) had 38 mg per 100 ml AAE titratable acidity compared with the original juice feed at 88 mg per 100 ml showing that the total acidity was lowered by more than half. However, for apple juice the NF permeate was 153 mg MAE per 100 ml compared with 148 mg per 100 ml in the juice feed. The total acidity was not lowered.

The reason for this is that sugarcane juice contains primarily aconitic acid molecular weight (MW) 174 which is a tricarboxylic acid and an isomer in the formation of citric acid. Apple juice contains primarily malic acid MW 134 which is a dicarboxylic acid. The greater molecular size of aconitic acid results in a higher rejection by the NF membrane. The lowering of total acidity should thus only apply to cane juice or grape (tartaric) or orange (citric) juice, not apple juice.

The NF permeate (SSE) for sugarcane juice had 0.6% total sugars for a juice feed stream of 10.6%. In contrast the NF permeate for apple juice (SSE) had 4.1% total sugars for a juice feed stream of 7.9%. The reason for this is that apple juice is composed mainly glucose and fructose (MW 180) whereas the sugarcane juice is primarily sucrose (MW 360). The residual sugars are therefore less in the cane juice.

In summary, some of the advantages of an electrolyte composition as exemplified include:

It simulates plant sap having a low sugar content with the minerals and antioxidants reflective of the natural content of the fluid in living cells.

It has a pleasant naturally slight salty taste with an absence of strong or off-flavours making it suitable to be consumed straight or formulated with flavours and other functional ingredients.

It provides a natural low calorie source of potassium which is an under consumed nutrient in the diet thereby enabling re-hydration and nutrition with low sugar intake compared to drinking juices.

It has a high potassium to low sodium ratio that is derived from the natural content of mineral in the cells and is therefore of benefit to limiting sodium intake in the diet where high dietary sodium has been linked to causing raised blood pressure.

It can be processed by physical separation without addition of chemicals to give a low acid content, low sugar and slightly salty taste that has a faster satiation effect for fluid consumption.

It has properties of thirst quenching and high potassium mineral balance that counter over-hydration which can be an issue with excessive intake of water.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to prior art information in this specification is not an admission that the information constitutes common general knowledge in Australia or elsewhere.

The invention claimed is:

1. A method of preparing a consumable plant-based electrolyte composition formulated as a drink product or beverage, a concentrate, a gel, a powder, a granule, a capsule or a tablet, wherein steps of the method comprise:
   (i) using a step of microfiltration or ultrafiltration to produce a clarified, substantially liquid extract selected from at least one of the group consisting of a substantially liquid extract of sugarcane, a substantially liquid extract of sugar beet, a substantially liquid extract of sweet sorghum, and palm syrup; and
   (ii) reducing the carbohydrate content of the clarified, substantially liquid extract using a step of nanofiltration to provide:
      a nanofiltration retentate; and
      a nanofiltration permeate, wherein the nanofiltration permeate provides a consumable plant-based electrolyte composition; wherein the consumable plant-based electrolyte composition comprises an electrolyte content of about 0.050% to 0.200% weight/volume potassium, about 0.000% to 0.050% weight/volume sodium and a carbohydrate content less than about 6% weight/volume; and (iii) selecting only the nanofiltration permeate and not any retentate; and (iv) formulating the nanofiltration permeate into the drink product or beverage, concentrate, gel, powder, granule, capsule or tablet.

2. The method of claim 1, wherein the step of formulating the nanofiltration permeate comprises the step of reverse osmosis filtration and/or evaporation to thereby provide a concentrate of the nanofiltration permeate.

3. The method of claim 1, wherein the substantially liquid extract is the substantially liquid extract of sugarcane.

4. The method of claim 3, wherein the substantially liquid extract of sugarcane is sugarcane juice.

5. The method of claim 1, wherein the substantially liquid extract is the substantially liquid extract of sugar beet.

6. The method of claim 5, wherein the substantially liquid extract of sugar beet is sugar beet juice.

7. The method of claim 1, wherein the nanofiltration retentate is used for sugar production.

8. The method of claim 1, wherein the consumable plant-based electrolyte composition provided in step (ii) has a carbohydrate content of less than about 2% weight/volume.

9. The method of claim 1, wherein the consumable plant-based electrolyte composition provided in step (ii) comprises about 0.064% to 0.109% w/v potassium.

10. The method of claim 1, wherein the consumable plant-based electrolyte composition provided in step (ii) comprises about 0.002% to 0.030% w/v sodium.

11. The method of claim 1, wherein the consumable plant-based electrolyte composition provided in step (ii) comprises about 0.01% to 1.60% w/v organic acid.

12. The method of claim 11, wherein the consumable plant-based electrolyte composition provided in step (ii) comprises about 0.11% to 0.21% w/v organic acid.

13. The method of claim 1, wherein the consumable plant-based electrolyte composition provided in step (ii) comprises:

(a) about $K^+$–0.064 to 0.109% w/v, $Na^+$–0.002 to 0.030% w/v, $Mg^{2+}$–0.002 to 0.010% w/v and about 0.5-2.0% w/v carbohydrates; or (b) about $K^+$–0.05 to 0.100% w/v, $Na^+$–0.002 to 0.010% w/v, $Mg^{2+}$–0.002 to 0.010% w/v and 0.5 to 6.0% w/v carbohydrates.

14. The method of claim 1, wherein step (iv) comprises formulating the nanofiltration permeate into a drink product.

15. The method of claim 1, wherein the step of formulating the nanofiltration permeate further comprises adding a sweetening agent to the nanofiltration permeate.

16. A method of preparing a consumable plant-based electrolyte composition formulated as a drink product or beverage, a concentrate, a gel, a powder, a granule, a capsule or a tablet, wherein steps of the method comprise:

(i) using a step of microfiltration or ultrafiltration to clarify a substantially liquid extract selected from at least one of the group consisting of a substantially liquid extract of sugarcane, and a substantially liquid extract of sugar beet; and (ii) reducing the carbohydrate content of the clarified, substantially liquid extract using a step of nanofiltration to provide:

a nanofiltration retentate which is used for sugar production; and a nanofiltration permeate, wherein the nanofiltration permeate provides a consumable plant-based electrolyte composition; wherein the consumable plant-based electrolyte composition comprises an electrolyte content of about 0.050% to 0.200% weight/volume potassium, about 0.000% to 0.050% weight/volume sodium and a carbohydrate content less than about 6% weight/volume; and (iii) selecting only the nanofiltration permeate and not any retentate; and (iv) formulating the nanofiltration permeate into the drink product or beverage, concentrate, gel, powder, granule, capsule or tablet.

17. The method of claim 16, wherein the step of formulating the nanofiltration permeate comprises the step of reverse osmosis filtration and/or evaporation to thereby provide a concentrate of the nanofiltration permeate.

18. The method of claim 16, further including the step of purifying sugar from the nanofiltration retentate.

* * * * *

UNITED STATES PATENT AND TRADEMARK OFFICE
CERTIFICATE OF CORRECTION

| | | |
|---|---|---|
| PATENT NO. | : 11,612,176 B2 | |
| APPLICATION NO. | : 16/275079 | |
| DATED | : March 28, 2023 | |
| INVENTOR(S) | : Roger Anthony Stanley et al. | |

It is certified that error appears in the above-identified patent and that said Letters Patent is hereby corrected as shown below:

On the Title Page

Item (57), Line 9, "or or" should be -- or for --.

Signed and Sealed this
Thirtieth Day of January, 2024

Katherine Kelly Vidal
*Director of the United States Patent and Trademark Office*